(No Model.)

A. M. CONE.
TAILOR'S MEASURE.

No. 497,165. Patented May 9, 1893.

WITNESSES:
H. Walker
C. Sedgwick

INVENTOR
A. M. Cone
BY
Munn & Co.
ATTORNEYS.

UNITED STATES PATENT OFFICE.

ABRAHAM M. CONE, OF LEE, MASSACHUSETTS.

TAILOR'S MEASURE.

SPECIFICATION forming part of Letters Patent No. 497,165, dated May 9, 1893.

Application filed October 19, 1892. Serial No. 449,343. (No model.)

*To all whom it may concern:*

Be it known that I, ABRAHAM M. CONE, of Lee, in the county of Berkshire and State of Massachusetts, have invented a new and useful Improvement in Tailors' Measures, of which the following is a full, clear, and exact description.

This invention relates to measuring instruments for the use of tailors or dressmakers, to facilitate the taking of measurements whereby to obtain an accurate cutting of garments for the upper part of the body.

The invention consists in a measuring instrument working upon the principle of a spirit level or levels, in distinction to the less accurate, more inconvenient, and indirect leveling device of a plumb, for getting in a direct manner, points on a level to work from, substantially as hereinafter described and pointed out in the claim.

The instrument is so organized as to level the body measurement from under the arm, also from the "natural hip," likewise give the measurement of the back, its width and height from the nape of the neck, depth and width of the arm pit, that is, how far the front portion of the shoulder projects forward, likewise serving to give the measurement of the depression above the hip from the center of the back to the hip on a straight line or at right angles from the front of the arm. By means of the points on a level obtained by the instrument to work from and by the aid of an ordinary tape measure, which may either be attached to the instrument or separate from it, the several body measurements can be taken either from the instrument when on the body, or from chalk or other marks made at the leveling points indicated by the instrument, and whereby the shoulder, side, back and hip measures can be accurately made.

Reference is to be had to the accompanying drawings forming a part of this specification, in which similar letters of reference indicate corresponding parts in all the views.

Figure 1:
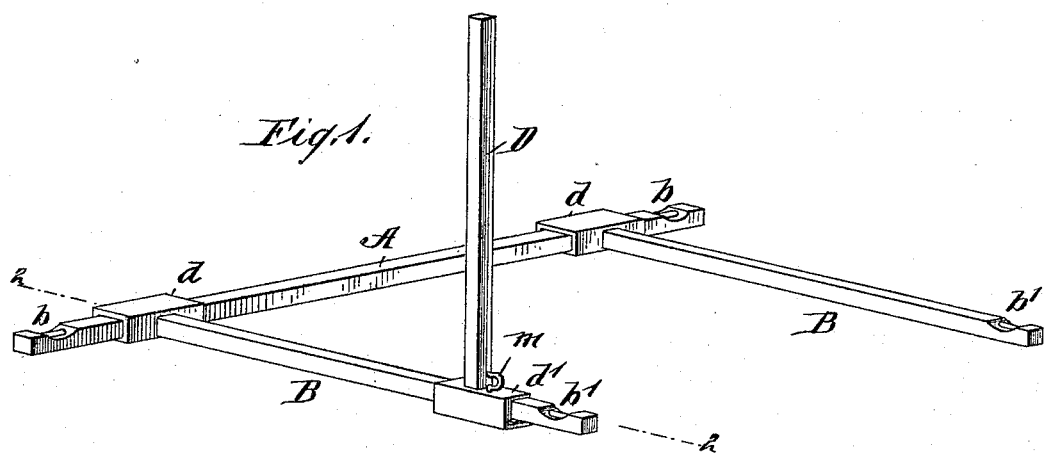
Figure 2:
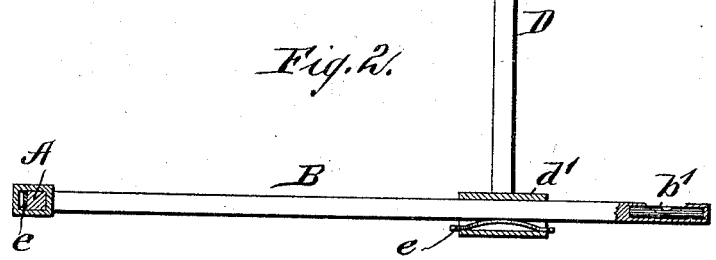
Figure 3:
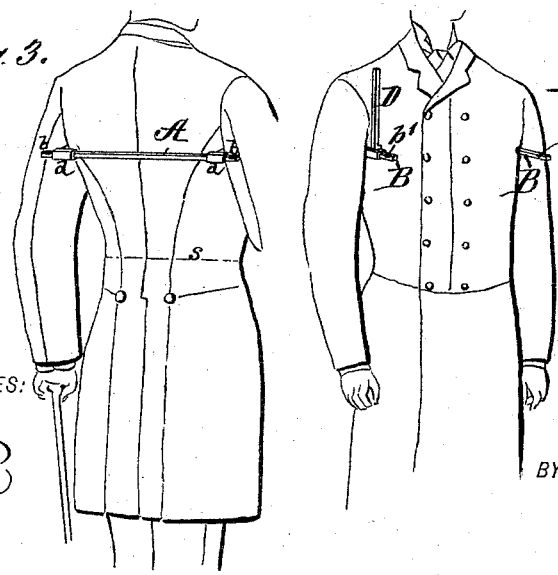

Figure 1 represents a view in perspective of my improved measure; Fig. 2 a vertical section of the same upon the line 2—2 in Fig. 1. Fig. 3 is a rear view of the instrument as applied across the upper part of the back of a person beneath the arm pits; and Fig. 4 is a front view of the person with the instrument so applied.

The instrument is composed of a horizontal back bar A, having a spirit level $b$ at one or both of its ends, opposite side horizontal bars B B, arranged to project in front of the back bar at right angles to the latter and parallel with each other also having spirit levels $b'$, $b'$, at or near their outer ends, and an upright rod or bar D, projecting upward from one of the side bars at right angles thereto. The side bars B B are carried by slides or sockets $d\ d$, adjustable on or along the back bar A, subject to the control of a spring $e$ within said slides, to give frictional pressure to prevent their slipping when adjusted nearer to or farther from each other according to the width of the back being measured, and the upright rod or bar D is carried by a similar slide or socket $d'$, having a like spring $e$ within it to prevent slip, and adjustable on or along the side bar which carries it. This bar D, or its slide $d'$ may be provided with a hook $m$, for attachment of the measuring tape, or an independent or loose measuring tape may be used.

By means of the spirit levels on the ends of the back bar A and side arms B B, the instrument may be placed directly, that is, without the aid of a line or rod-like plumb, in a perfectly level position so as to secure accurate measurements.

Figure 4:
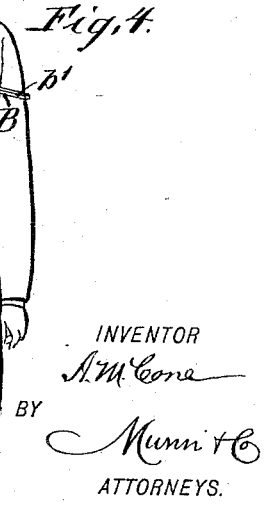

Applied to the person, as in Figs. 3 and 4, the leveling back bar A and leveling side bars B B adjustable thereon or along it, and the upright bar D adjustable along the one of said arms, provide for leveling the body measurement from under the arm and for getting level points to work from by the aid of the measuring tape, in various directions, also give the measurement of the back, its width and height from the nape of the neck, and, by the side bars B B, and upright D in front, the depth and width of the arm pit, showing how far the front portion of the shoulder projects forward, regardless of whether the person being measured stands in an erect or stooping position.

By applying the instrument with its back bar A across the back of the person, upon the dotted line s in Fig. 3, the measurement of the depression above the hips may also be taken.

Having thus described my invention, I claim as new and desire to secure by Letters Patent—

The within-described tailor's measuring instrument, consisting of a horizontal back bar having a spirit level at or near one or both of its ends, horizontal side bars having spirit levels at or near their outer ends, said side bars standing at right angles to and in front of the back bar and adjustable toward or from each other along said back bar, and an upright rod or bar in sliding or adjustable connection with and along one of said side bars, substantially as set forth.

ABRAHAM M. CONE.

Witnesses:
JAMES O'BRIEN,
C. H. CUTTING.